2 Sheets—Sheet 1.

A. L. SPENCE.
COMBINED SCRAPER, CHOPPER AND DIRTER.

No. 172,193. Patented Jan. 11, 1876.

WITNESSES:
A. W. Almqvist
A. F. Terry

INVENTOR:
A. L. Spence
BY
ATTORNEYS.

2 Sheets—Sheet 2.
A. L. SPENCE.
COMBINED SCRAPER, CHOPPER AND DIRTER.
No. 172,193. Patented Jan. 11, 1876.
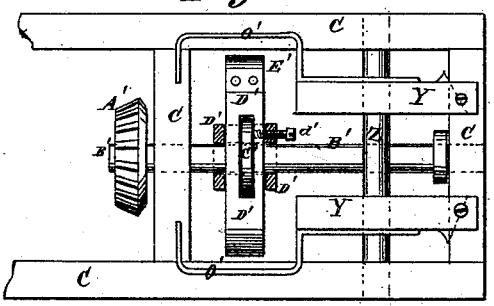
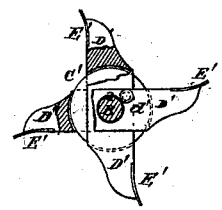
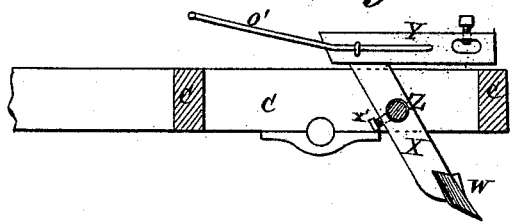

UNITED STATES PATENT OFFICE.

ARTHUR L. SPENCE, OF ALMA, ARKANSAS.

IMPROVEMENT IN COMBINED SCRAPERS, CHOPPERS, AND DIRTERS.

Specification forming part of Letters Patent No. 172,193, dated January 11, 1876; application filed July 24, 1875.

*To all whom it may concern:*

Figure 1:
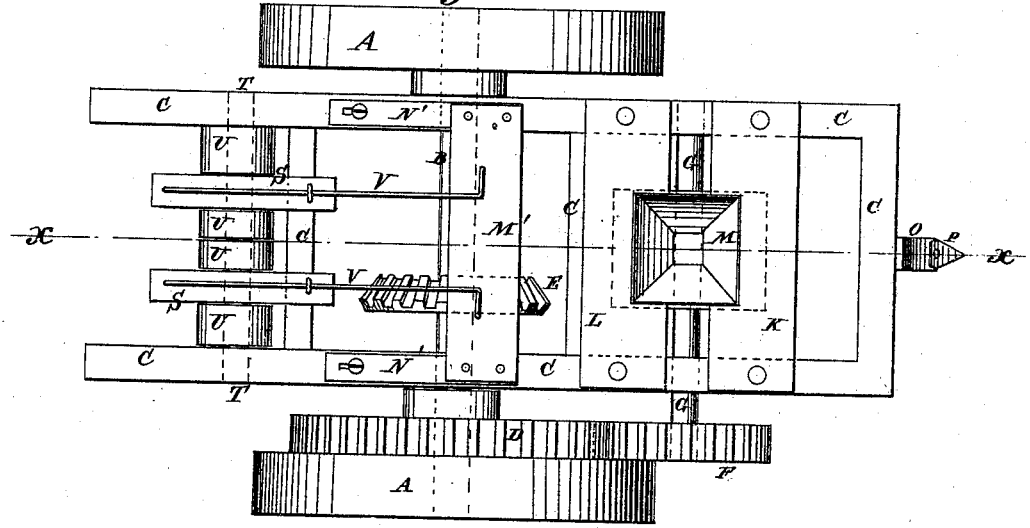
Figure 2:
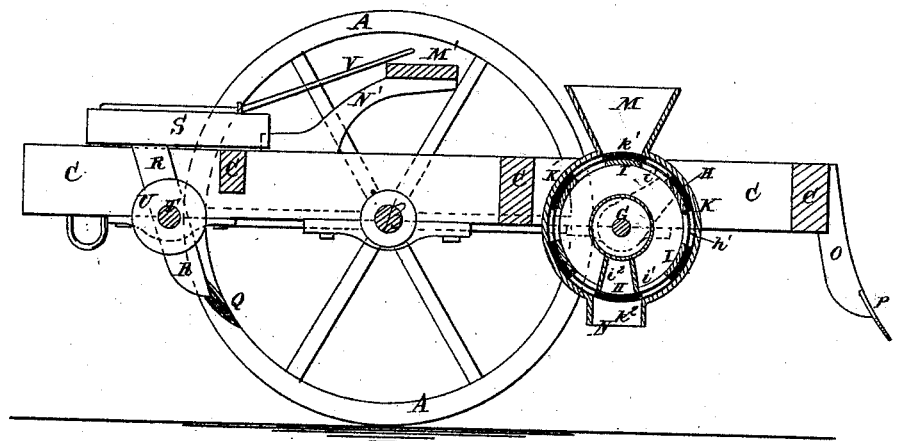
Figure 4:
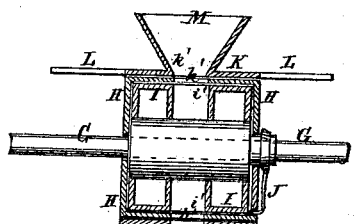
Figure 3:
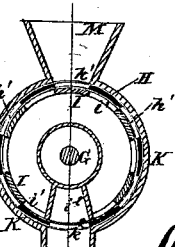

Be it known that I, ARTHUR L. SPENCE, of Alma, in the county of Crawford and State of Arkansas, have invented a new and useful Improvement in Combined Scraper, Chopper, and Dirter, of which the following is a specification:

Figure 1, Sheet 1, is a top view. Fig. 2, Sheet 1, is a vertical longitudinal section of the same taken through the line $x\,x$, Fig. 1. Fig. 3, Sheet 1, is a detail section. Fig. 4, Sheet 1, is a detail longitudinal section of the same taken through the line $y\,y$, Fig. 3. Fig. 5, Sheet 2, is a top view of the forward part of the machine when adjusted for scraping, chopping, and dirting cotton, part of the chopper being broken away to show the construction. Fig. 6, Sheet 2, is a detail view of the chopper, part being broken away to show the construction. Fig. 7, Sheet 2, is a detail longitudinal section, showing one of the scrapers in side view.

Similar letters of reference indicate corresponding parts.

The invention will first be described in connection with drawing, and then pointed out in the claim.

A are the drive-wheels, one of which is rigidly connected with, and the other revolves loosely upon, the ends of the axle B. The axle B revolves in bearings attached to the side bars of the frame C, which thus rides upon, and is supported by, the said axle B. To the fixed wheel A, or to the axle B, at the inner side of said fixed wheel, is rigidly secured a large gear-wheel, D, and to the said axle B, between the side bars of the frame C, is rigidly attached a large bevel-gear wheel E. The wheels D E are designed to drive the seed-dropping device and the choppers, as hereinafter fully described. The teeth of the gear-wheel D mesh into the teeth of the smaller gear-wheel F attached to the end of the shaft G, which revolves in bearings attached to the side bars of the frame C. Upon the middle part of the shaft G is placed a hollow drum, H, and within it is placed a shorter hollow drum or wheel, I. Around the middle part of the hollow drum H is formed a circle of openings, $h'$, and around the middle part of the hollow wheel, I is formed a circle of corresponding openings, $i^1$. Either the drum H or the wheel I is rigidly connected with the shaft G, and the two drums are connected together by the spring-catch J, which is attached to the hub of the inner drum I, and the outer end of which enters a hole in the end of the outer drum H. Two holes are formed in the end of the drum H to receive the end of the spring-catch J, so that the two drums H I may be adjusted with their holds $h'\,i^1$ opposite to each other, as shown in Fig. 2, in which case the seed will be dropped in drills or adjusted to bring the closed spaces of each of the drums H I opposite the holes in the other part, as shown in Fig. 3. One of the closed spaces of the inner drum I is cut away, and is replaced by a cup, $i^2$, of such a size as to contain enough seed for a hill, so that with this adjustment seed for a hill may be dropped at each revolution of the two drums. The outer drum H is surrounded by a wide band or tubular case, K, which is held stationary by having its upper side attached to a plate, L, secured to the frame C. In the upper side of the case K is formed a hole, $k^1$, leading into the hopper M, which is secured to the case K or plate L, either or both. In the lower side of the case K is formed a hole, $k^2$, leading into the spout N, by which the seed is conducted to the ground, and which is attached to the lower side of the case K. To the center of the front cross-bar of the frame C is attached a standard, $o$, to the lower end of which is attached a plow, P, to open a furrow to receive the seed. After the seed has been deposited in the furrow the said furrow is filled, and the seed is covered by the plows Q, which are attached to the lower ends of the two standards R. The upper ends of the standards R are attached to the beams S, the forward ends of which rest upon a cross-beam of the frame C to prevent the standards R from swinging back under the pressure of the draft strain. In the upper part of the standards R is formed a hole to receive a shaft, T, the ends of which are inserted in holes in the side bars of the frame C. The standards R are kept in their proper relative positions upon the shaft T by tubular washers U placed between the said standards, and between the standards and the side bars of the frame C.

To the beams S are attached levers V, which extend forward into such a position that they may be reached and operated by the driver from his seat to raise the plows from the ground when required. As thus far described, the machine is adjusted for planting seeds in drills and hills. When the machine is to be used for cultivating the plants the seed-dropping device H I J K L M, and its shaft G and gear-wheel F, and the opening-plow O P are removed, and scrapers and choppers are attached to the forward part of the frame C. The scraper-plates W are attached to the lower ends of the standards X, the upper ends of which are attached to the beams Y. The forward ends of the beams Y rest upon the front cross-bar of the frame C to prevent the standards X from swinging back under the pressure of the draft strain. In the upper part of the standard X are formed holes to receive the shaft Z, the ends of which are inserted in holes in the forward parts of the side bars of the frame C. The standards X are kept in proper position by set-screws $x'$, or by washers. $A'$ is a bevel-gear wheel, the teeth of which mesh into the teeth of the gear-wheel E, and which is attached to the rear end of the shaft $B'$. The shaft $B'$ revolves in bearings in the center of the front and middle cross-bars of the frame C, and to it, in the rear of the scrapers W X Y, is keyed or otherwise secured a small wheel, $C'$. $D'$ are two bars, to the opposite sides of the ends of which are attached the chopper-plates $E'$, and through the center of both of which is formed a hole to receive the shaft $B'$, and the middle part of one of which is mortised to receive the other. Both of the bars $D'$ are slotted in their middle part to receive the wheel $C'$. The bars $D'$ are connected with the wheel $C'$ by one or more set-screws, $d'$, which pass through the bars $D'$, and press against the side of the wheel $C'$ with sufficient force to cause the shaft $B'$ and wheel $C'$ to carry the chopper-bars $D'$ with them under ordinary circumstances; but should the choppers $E'$ strike an obstruction the set screw or screws $d'$ will allow the bars $D'$ to stop while the shaft $B'$ and wheel $C'$ continue their revolution. With this construction, as the machine is drawn forward the row of plants is scraped by the scrapers W X Y, is chopped to a stand by the choppers $E'$ $D'$, and is dirted by the plows Q R S.

Having thus described my invention, I claim as new and desire to secure by Letters Patent—

The chopper-bars $D'$ and wheel $C'$, connected together by one or more screws, $d'$, that pass through the former and against the latter, as and for the purpose specified.

ARTHUR LEWIS SPENCE.

Witnesses:
JAMES K. RALEIGH,
JOHN C. BETTEN.